United States Patent [19]

Rex

[11] 4,437,995

[45] Mar. 20, 1984

[54] TREATMENT OF GEOTHERMAL BRINE SULFATE-RICH FLUIDS TO FACILITATE THE PRECIPITATION OF SILICA

[75] Inventor: Robert W. Rex, La Habra, Calif.

[73] Assignee: 501 Republic Geothermal, Inc., Santa Fe Springs, Calif.

[21] Appl. No.: 477,954

[22] Filed: Mar. 23, 1983

[51] Int. Cl.³ .............................................. C02F 1/52
[52] U.S. Cl. .................... 210/714; 210/717; 210/718; 210/747
[58] Field of Search .......... 210/665, 714–717, 210/718, 737, 747, 712; 423/339; 60/641.2; 166/265, 267

[56] References Cited

U.S. PATENT DOCUMENTS

| | | | |
|---|---|---|---|
| 3,951,794 | 4/1976 | Swearingen | 210/714 X |
| 4,016,075 | 4/1977 | Wilkins | 210/712 |
| 4,302,328 | 11/1981 | Van Note | 210/737 X |
| 4,370,858 | 2/1983 | Awerbuch et al. | 210/747 X |
| 4,405,463 | 9/1983 | Tost et al. | 210/717 X |

Primary Examiner—Thomas G. Wyse
Attorney, Agent, or Firm—Curtis, Morris & Safford

[57] ABSTRACT

A method for the treatment of geothermal brines to control the precipitation of silica is disclosed. A sulfate-rich liquid is introduced into geothermal brine within a production well prior to flashing or is introduced into the residual geothermal brine remaining after the brine has been flashed to produce steam. The sulfate in the liquid reacts with the barium, calcium, and/or lead salts within the brine to produce a colloidal suspension which serves to accelerate precipitation of silica from the brine and to adsorb the precipitated silica particles. The colloidal suspension with its adsorbed silica particles is then removed from the brine by conventional gravimetric or filtration methods.

The method of the invention substantially reduces the deposition of silica in wellbores and in energy extraction equipment and facilitates removal of the silica from the brine. The method further reduces the deposition of silica in injection wells wherein the silica cleansed brine is discharged.

9 Claims, 2 Drawing Figures

TREATMENT OF GEOTHERMAL BRINE SULFATE-RICH FLUIDS TO FACILITATE THE PRECIPITATION OF SILICA

This invention relates generally to methods for reducing the deposition of silica in geothermal brines, in the wells from which such brines are produced and in the energy recovery systems wherein they are employed. More specifically this invention relates to a method for stabilizing the silica content of superheated hypersaline brines supersaturated in silica by using naturally occurring, sulfate-rich surface or ground waters to form a colloidal suspension. Even more specifically this invention relates to a method for treating either spent, post-flash geothermal brine produced in an energy extraction process or superheated geothermal brine within a production well in order to stabilize the silica content and permit controlled removal of the silica.

BACKGROUND OF THE INVENTION

The recent world-wide energy shortage has provoked much technical interest in development of energy sources other than those relying on oil and natural gas. Among these alternative sources is geothermal energy which has been viewed, in particular, as a source for electrical power generation and has therefore been recently considered as an economically attractive alternate to fossil fuels. Geothermal energy does not typically result in production of atmospheric pollutants and where capital and operating cost benefits are achievable, substantial advantages over conventional energy generation systems may be realized.

Geothermal energy sources usually are based on either a supply of subsurface steam or subsurface superheated hot water. The latter sources are substantially more common than are the former and consequently much effort has gone into development of methods to convert geothermal hot water into electrical power.

The normal energy recovery procedure includes the steps of withdrawing superheated water from a geothermal well and thereafter flashing it to form a steam phase, separating the available steam at the surface in a flash drum or similar separator and thereafter driving a steam turbine with the steam, and ultimately disposing of the spent hot water.

Among the significant problems faced by those employing geothermal hot water wells for the generation of electrical energy is the deposition of salts in the well and in the separators and power generation equipment. Typically geothermal brines have extremely high levels of dissolved solids and as the brines are cooled and made more concentrated by release of substantial parts of their water content in the flash step, the solids tend to deposit in the wellbore, the valves or pipes, the flash drums and other related equipment. This disadvantageous result is in particular encountered where the geothermal brines are supersaturated in silica.

The silica deposition necessitates either frequent cleaning of the wellbore and associated piping and steam separators, which is difficult and time consuming as well as expensive and disruptive of the entire operation, or, requires use of expensive chemical control methods involving introduction of additives to the geothermal brine. Neither method is entirely satisfactory and both are expensive.

This invention relates in particular to methods for controlling the deposition of silica solids from superheated hypersaline brine such as those encountered in the Salton Sea Known Geothermal Resource Area of the Imperial Valley in Calif. These geothermal brines, upon being brought to the surface for the purpose of extracting their energy, are depressurized and cooled and when this occurs the silica contained therein begins to precipitate from the brine. The residual brine becomes substantially more concentrated in dissolved chemicals, silica in particular, and the latter begins to precipitate and deposit. Silica precipitation continues until the concentration in the cooled, flashing brine reaches an equilibrium value.

Thus, supersaturated geothermal brines in wells found in the vicinity of Niland, Calif. may contain concentrations of silica in excess of 500 mg/l prior to flashing as compared to an equilibrium concentration of silica at 200° F. and atmospheric pressure of about 180 mg/l The silica which precipitates out and deposits in the pipes and associated production equipment is amorphous. Severe fouling of the well, the pipes and the related equipment as well as scaling and corrosion is the inevitable result.

It is typical practice in operation of geothermal wells to dispose of the spent brines by injecting them into subterranean formations known as injection reservoirs through separate injection wells. Solid silica precipitating out from the geothermal brine tends to plug these injection wells and reservoirs and can in a short period of time interfere with brine disposal operations.

DESCRIPTION OF THE PRIOR ART

Several methods for controlling silica precipitation in wells employing superheated hypersaline geothermal brines have been suggested. A first method is described in U.S. Pat. Nos. 4,302,328 and 4,304,666 to Van Note. The method relates to the treatment of spent geothermal brine to remove silica prior to pumping it to an injection well. The spent geothermal brine is introduced into a reactor-clarifier. Recycled, settled silica particles are introduced into the reaction well of the reactor-clarifier to mix with the brine and thereby provide seed nuclei to precipitate still more silica particles.

The disadvantage of the method of the '328 and '666 patents is that relatively long settling reaction times are required to remove sufficient silica from the spent brine so that it may be pumped into the injection well without concern for silica deposition in the injection wells. The relatively slow settling rate mandates that large, expensive reactor-clarifier systems be employed. It is also very difficult to control the settling reaction because the kinetics of that reaction are difficult to control. That is because negatively charged colloidal silica is used to scavenge negatively charged hydrated silica ions that readily supersaturate and are subject to very sluggish kinetics.

A second method for controlling silica precipitation is to maintain the pressure and temperature conditions of the brine at sufficiently elevated levels throughout the energy recovery system so as to minimize silica precipitation. Industrial processes have been conducted wherein the pressure and temperature of brine have been maintained at about 150 psi and 300°–325° F. respectively throughout the entire system. This substantially avoids silica precipitation and scaling as well as corrosion and plugging of the downstream areas of the powerplant.

The major disadvantage of this method is in its intrinsic thermodynamic inefficiency. By maintaining the system under elevated pressure and temperature it is not possible to extract as much energy as might otherwise be available where the brine is flashed to atmospheric pressure and lower temperatures. Less steam is developed and less energy per unit of geothermal brine is produced. Moreover this method is very sensitive to mechanical upsets which cause depressurization and attendant silica deposition throughout the entire system.

Still another method to reduce silica deposition and scaling includes the use of various coagulants in the geothermal brine prior to the settling process. By introducing coagulants it is possible to gather suspended particles contained in the brine and form larger aggregate particles, i.e., a floc, which enhances settling. The benefit of adding coagulant is that smaller settling tanks and equipment can be used than would be the case if such coagulants were not employed. The obvious disadvantages are increased operating cost for the process due to the cost of coagulant chemicals such as aluminum sulfate, ferrous and ferric sulfate, sodium aluminate, chlorinated copperas (ferric chloride/ferric sulfate), calcium carbonate and cationic electrolites. Still a further disadvantage is that there is an increase in the volume of the settling materials due to the presence of the silica-coagulant sludge. This increases the cost of waste disposal.

OBJECTS OF THE INVENTION

It is thus a primary object of this invention to control the deposition of silica in geothermal brines and in particular in the wells from which those brines are obtained and in the energy recovery systems in which they are employed.

It is a further object of this invention to treat geothermal brines either prior to the energy extraction step or after the energy extraction step to reduce the precipitation of silica in the wellbore, in the piping and in the related energy extraction equipment.

It is still a further and related object of this invention to control the removal of silica-containing solids from geothermal brines supersaturated in silica by accelerating the precipitation and sedimentation of silica under conditions which permit its efficient removal from the brine.

These and other objects of the invention are achieved in a process for accelerating the precipitation and sedimentation of dissolved and suspended silica solids, in hypersaline supersaturated geothermal brines, in a controlled manner, by injecting a sulfate-rich fluid into the brine. It has now been found that by introducing a sulfate-rich stream into the supersaturated geothermal brine it is possible to form a colloidal suspension in the brine which causes silica to precipitate from the brine and be collected within the colloidal suspension.

The sulfate-rich fluid reacts with the brine to form a heavy metal sulfate colloidal suspension. In particular, the sulfate ion reacts with the inherent chemical constituents of the brine, principally barium ($Ba^{++}$), calcium ($Ca^{++}$) and lead ($Pb^{++}$). These metal ions react with the sulfate ion to form the respective sulfate salts which in turn form a metal colloidal suspension. Barium sulfate in particular forms a fine colloidal suspension dispersed throughout the brine. It has been found that these colloidal suspensions are substantially more effective in causing precipitation of silica from the geothermal brine than is the "silica seed" of the methods described above in U.S. Pat. Nos. 4,302,328 and 4,304,666.

The colloidal suspension of barium sulfate, calcium sulfate or lead sulfate acts in two ways to cause silica precipitation from the brine. First, the high surface area colloidal particles act as seed nucleii for silica precipitation. They also serve to temporarily stabilize the silica as a dilute dispersion of small colloidal particles so that silica scale does not form in the well casing. Secondly, the cationic characteristic of the colloidal suspension encourage further silica precipitation and particle aggregation.

Thus by employing the method of the invention it is possible to rapidly precipitate silica from solution by reducing the chemical activation energy normally required for silica precipitation. By maintaining an excess of heavy metal in the brine relative to the sulfate injected, the colloidal suspension can be maintained in a cationic state thereby accelerating the rate of coalescence or flocculation by charge attraction. As coalescence occurs, the mass of the particles increases and this in turn leads to faster settling in traditional gravimetric sedimentation systems or leads, alternatively, to more efficient particle removal procedures by traditional filtration systems.

DESCRIPTION OF THE PREFERRED EMBODIMENTS

Figure 1:
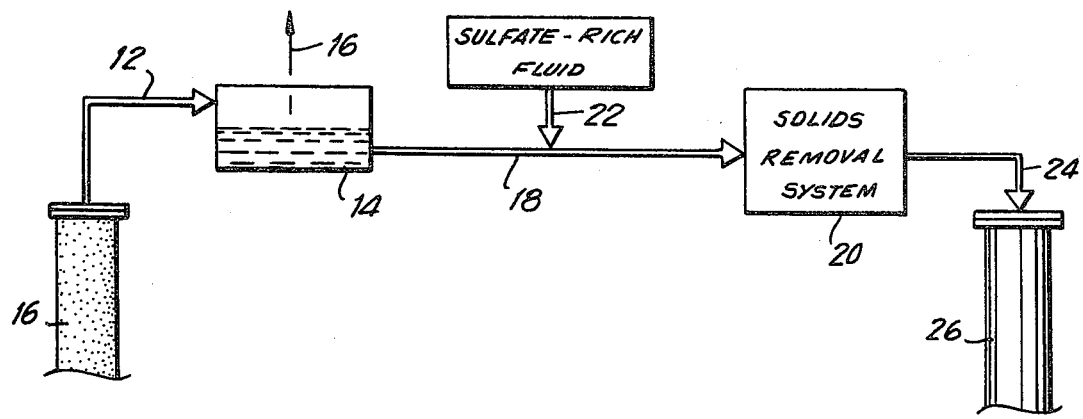

There are two preferred embodiments. In the first, the sulfate-rich fluid is injected into the spent brine after the brine is removed from the well and flashed. The resulting metal sulfate colloidal suspension immediately accelerates silica precipitation from the spent brine downstream of the flash zone. In order to thoroughly blend the injected sulfate-rich fluid with the spent brine, a mixing tank or other appropriate mixing system is employed upstream of the principal solids removal system. The silica precipitate and the metal sulfate colloidal suspension are separated from the spent brine and the latter, free of colloidal suspension and silica, is disposed of in an injection well or other brine disposal system. The silica plus heavy metal sulfate-rich sludge is separately removed.

In the second preferred embodiment of the invention, the sulfate-rich fluid is introduced into the brine in or upstream of the flash zone. For example it may be injected through a tubular annulus in the production well and thereby thoroughly mixed with the geothermal brine as it is being produced.

The advantage of the second method is that it provides early and turbulent contact of the sulfate-rich fluid with the geothermal brine as it is being produced. The sulfate-rich liquid is in intimate contact with the geothermal brine as the latter rises through the wellbore and flashes into steam. The brine emanating from the wellbore and in a semi-flashed state will form a fine metal sulfate colloidal suspension which will adsorb silica as it precipitates out from the flashing brine. This prevents the silica from depositing on the surfaces of the wellbore and the related production pipe and equipment. The violent turbulence of the mixing within the flashing brine minimizes both the size of the insoluble sulfate seed material and the aggregated silica particles within the colloidal suspension. This has the effect of blocking the scaling tendency of the brine. The flow of the geothermal fluid carries the colloidal suspension and adsorbed silica through the system to the flash tank or separator and thereafter the silica-rich colloidal suspension passes downstream with the post-flash geothermal brine.

Downstream of the flash separator the heavy metal sulfate colloidal suspension continues to activate silica precipitation, flocculation and continues to improve the rate of settling. This permits more efficient and speedier removal of the silica from the brine by whatever gravimetric or filtration method is chosen.

A preferred source of sulfate ion in the Salton Sea KGRA is available surface water channeled to the region from the Colorado River. It is known that this surface water has a sulfate concentration in excess of 330 mg/l. It is thus suitable as the sulfate-rich brine treatment liquid for introduction into the geothermal brine.

Any naturally available surface or ground water with sufficient dissolved sulfate concentration may be suitable as the sulfate-rich brine treatment liquid unless it contains chemical constituents which otherwise interfere with the formation of the heavy metal sulfate colloidal suspension or which otherwise cause undesirable chemical reactions within the brine. In the absence of naturally occurring sulfate-rich treatment liquids, appropriate treatment liquids can be prepared by mixing sulfate salts with available water.

Figure 2:
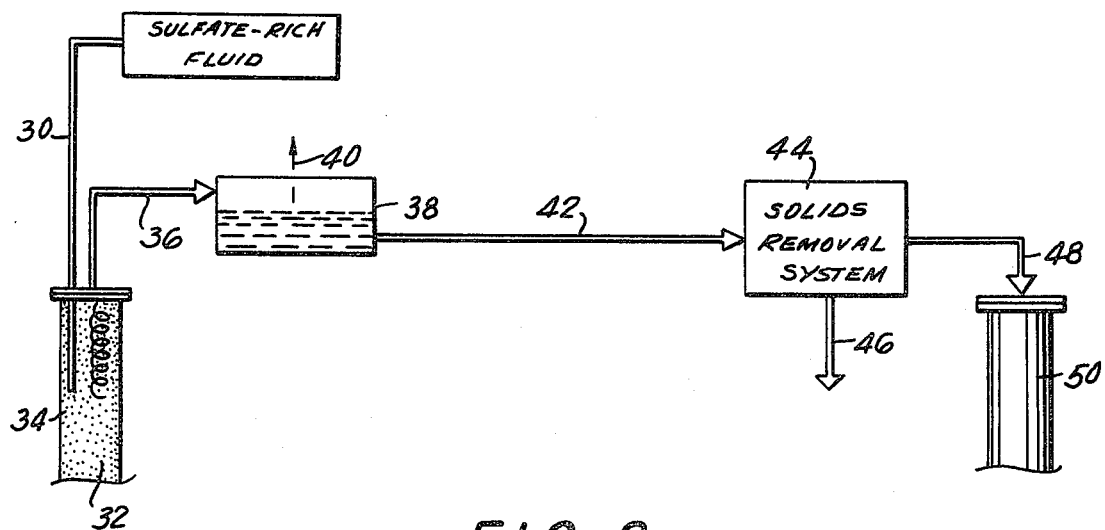

The economic advantages of employing an available untreated surface or ground water is self-evident. Chemical costs for brine treatment chemicals are reduced and the economic disadvantages of the lengthy settlement procedures described above in connection with the prior art processes is avoided. The treatment liquid can be metered into the brine at a rate sufficient to provide adequate sulfate for producing the desired suspension but not so fast as to upset the cationic nature of the colloidal suspension. It is well thin the skill of the art to determine the optimum amount of sulfate to be injected into the brine either from empirical observations and/or measurements of the treated brine. In the drawings:

FIG. 1 is a schematic representation of a process according to the invention wherein sulfate-rich fluids are introduced into the geothermal brine after it has been flashed to produce steam; and FIG. 2 is a schematic representation of process according to the invention wherein sulfate-rich fluid is ntroduced into superheated geothermal brine within a production well. In FIG. 1, reference numeral 10 identifies the production well from which superheated geothermal brine is supplied. Reference numeral 12 identifies a conduit which carries the brine into flash tank separator 14 wherein brine is separated from flashed steam and non-condensable gases. The latter are removed via conduit 16. The spent geothermal brine passes via conduit 18 to a solids removal system 20.

A sulfate-rich fluid, preferably a naturally occurring ground water containing a sufficiently high concentration of sulfate ion, is introduced into the spent geothermal brine via conduit 22 and the sulfate-rich liquid and spent brine are mixed within conduit 18 prior to their introduction into solids removal system 20. The barium, calcium and lead within the spent geothermal brine reacts with the sulfate ion to form a colloidal suspension in the area downstream of where the sulfate-rich liquid 22 is introduced. The colloidal suspension together with precipitated and adsorbed silica particles is removed in solids removal system 0 and the cleansed, solid silica-free brine is removed via conduit 24 and pumped to an injection well 26.

In the embodiment of FIG. 2 the sulfate-rich fluid 30 is introduced beneath the surface of the ground into the superheated geothermal brine 32 in well 34. The reaction of the sulfate-rich liquid and the geothermal brine takes place within well 32 and the reacted mixture is removed from the well via conduit 36. The so-treated brine is introduced to flash tank separator 38 from which flashed steam and non-condensable gases are removed via conduit 40. The spent brine containing the colloidal suspension of heavy metal sulfates upon which the silica particles are adsorbed passes via conduit 42 to solids removal system 44. The colloidal suspension and silica particles are removed via conduit 46 and the cleansed brine passes via conduit 48 to injection well 50.

What is claimed is:

1. A method for controlling the precipitation of silica from geothermal brine supersaturated with silica comprising the steps of: adding into said brine a liquid rich in sulfate ion and thereby forming, by reaction of said sulfate-rich liquid and salts contained within said brine, a fine, metal sulfate colloidal suspension containing adsorbed silica solids; and separating said suspension and adsorbed silica solids from said brine.

2. A method as recited in claim 1 wherein a sulfate-rich liquid is introduced into the residual geothermal brine remaining after superheated geothermal brine from a production well has been flashed to produce steam.

3. A method as recited in claim 1 wherein a sulfate-rich liquid is introduced into superheated geothermal brine prior to flashing said brine to produce steam.

4. A method for controlling the removal of silica-containing solids from geothermal brine supersaturated in silica by accelerating the precipitation and sedimentation of silica from said brine under controlled conditions, comprising the steps of
   (a) introducing a liquid stream rich in sulfate ion into a stream of said supersaturated geothermal brine and thereby forming, together with heavy metal ions in said brine, a sulfate colloidal suspension;
   (b) permitting said colloidal suspension to contact the supersaturated silica in said brine and thereby cause same to precipitate and the particles thereof to aggregate and adsorb on said colloidal suspension; and
   (c) removing the said suspension and adsorbed particles of silica by a gravimetric method.

5. A method as recited in claim 4 wherein said sulfate-rich stream is a naturally occurring surface or ground water having a sulfate concentration sufficient to form a metal sulfate colloidal suspension when mixed with geothermal brines containing heavy metals.

6. A method as recited in claim 4 wherein said sulfate rich stream is introduced into spent geothermal brine formed when superheated geothermal brine is flashed to remove steam.

7. A method as recited in claim 4 wherein said sulfate-rich stream is introduced into superheated geothermal brine prior to the removal of said brine from a production well.

8. A method as recited in claim 4 wherein said sulfate-rich stream is thoroughly mixed with said geothermal brine in order to promote the formation of the heavy metal sulfate colloidal suspension.

9. A method for controlling the deposition of lica-containing solids from geothermal brines containing ssolved barium, calcium and/or lead salts, comprising the steps of
   (a) introducing a naturally occurring surface or ground water rich in sulfate ion into (i) spent geothermal brine produced from the flashing of a superheated geothermal brine, or
(ii) superheated geothermal brine emanating from a production well, or
(iii) superheated geothermal brine within a production well, and thereby producing a colloidal suspension of barium sulfate, calcium sulfate and/or lead sulfate;

(b) causing the said formed colloidal suspension to actively contact the said geothermal brine in order to act as seed nuclei for silica precipitation and to temporarily stabilize the silica as a dilute dispersion of small colloidal particles, and
(c) removing the said formed colloidal suspension and adsorbed stabilized silica from said geothermal brine by gravimetric or filtration means.

* * * * *

UNITED STATES PATENT AND TRADEMARK OFFICE
CERTIFICATE OF CORRECTION

PATENT NO. : 4,437,995
DATED : March 20, 1984
INVENTOR(S) : Robert W. Rex

It is certified that error appears in the above-identified patent and that said Letters Patent is hereby corrected as shown below:

In the title of the invention, after the word "BRINE"

please insert --WITH--

Signed and Sealed this

Twenty-first Day of August 1984

[SEAL]

Attest:

GERALD J. MOSSINGHOFF

Attesting Officer

Commissioner of Patents and Trademarks